No. 761,581. PATENTED MAY 31, 1904.
C. CLUTHE.
VENTILATING, HEATING, AND COOLING APPARATUS.
APPLICATION FILED JAN. 8, 1901.
NO MODEL.
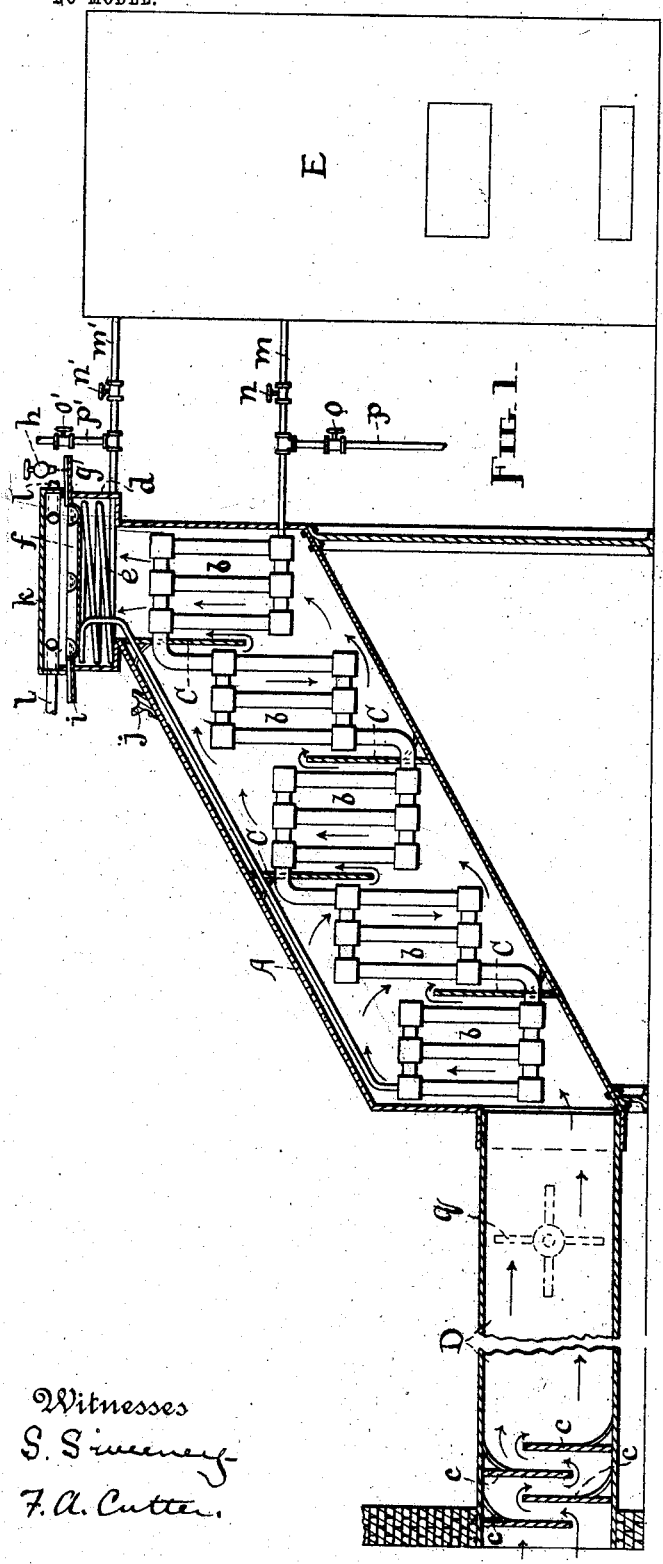
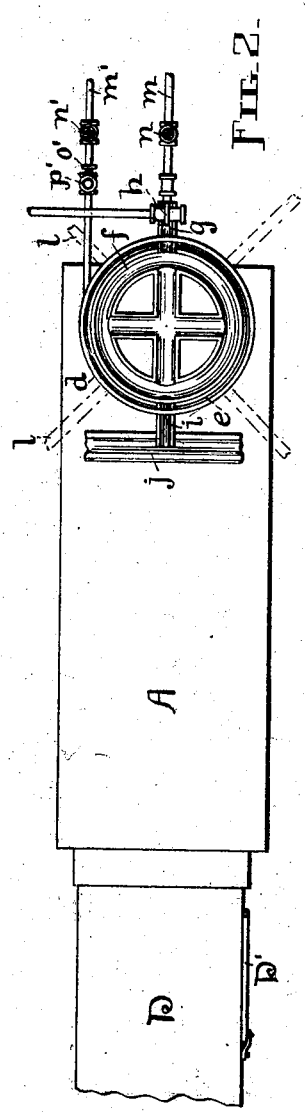
Witnesses
S. Sweeney
F. A. Cutter
Inventor
Charles Cluthe
By Webster Tafel & Tilley
Attorneys.

No. 761,581. Patented May 31, 1904.

UNITED STATES PATENT OFFICE.

CHARLES CLUTHE, OF NEW YORK, N. Y.

VENTILATING, HEATING, AND COOLING APPARATUS.

SPECIFICATION forming part of Letters Patent No. 761,581, dated May 31, 1904.

Application filed January 8, 1901. Serial No. 42,518. (No model.)

*To all whom it may concern:*

Be it known that I, CHARLES CLUTHE, a citizen of the United States of America, residing at New York, in the county of New York and State of New York, have invented new and useful Improvements in Ventilating, Heating, and Cooling Apparatus, of which the following is a specification, reference being had to the accompanying drawings and the letters of reference marked thereon.

The object of my invention is to provide an improved system and apparatus for the convenient and economical heating or cooling and ventilating of rooms in a building, and I accomplish the objects of my invention by the construction herein set forth.

In the accompanying drawings, in which like letters of reference indicate like parts, Figure 1 is a sectional side elevation of my improved device, and Fig. 2 a plan view of the same with the outlet-cover removed.

In the construction of my improved device I provide a case or box $A$, preferably of metal and suitably supported in an inclined position, as shown in Fig. 1. The inclined position of the case and step-by-step arrangement of internal coils or radiators presently to be described facilitates the circulation of the air in said case where the device is employed as a heater, since hot air rises, and when used for cooling purposes this arrangement affords means for forming a cooling-chamber or refrigerator beneath the case by inclosing the space below the same. Within the case $A$, I arrange a series of pipes, coils, or radiators $b$, the top of each succeeding set extending above the top of the set preceding, beginning at the left-hand end, as shown. Between each pair of sets a deflecting plate or partition $C$ is introduced, one series depending from the top of the case and the other series rising from the bottom thereof, the upper and lower plates alternating with each other. The plates $C$ extend only part way between the top and bottom of the case $A$, and the air in its passage through said case is compelled by said plates to pass in a tortuous course, and thereby brought into close contact with the coils $b$ to be heated or cooled, according to the purpose for which the apparatus is employed at the time.

An air-inlet conduit $D$ extends from the lower end of the case $A$ to a point outside of the building, where it opens, and to avoid varying pressure occasioned by differences in the force and direction of the wind plates $c$ are provided in the outer terminal of said conduit, said plates being arranged in a similar manner to the plates $C$. Now when the wind blows toward the exposed open end of the conduit $C$ an objectionable rush of air through said conduit is obviated, as the plates $c$ check the air and prevent it from passing into the case $A$ with undue force.

A receptacle $d$ is formed above or over the highest part of the case $A$, which opens into the same. This receptacle is supplied with a coil $e$, on which is placed a water-reservoir or evaporating-pan $f$ of any suitable construction which will allow for the passage of air around, through, or over the same. The form of pan $f$ shown in the drawings is considered to be as good as any, and by preference it should rest upon the coil $e$, although this is not imperative. A trough $g$ opens at one end into the pan $f$ and extends therefrom through the side of the receptacle $d$ beneath a faucet $h$, which is adapted to supply water thereto drop by drop. To avoid danger of overflow resulting from the accidental supply of more water than is taken up by evaporation, an overflow-trough $i$ opens into the pan $f$ at one end and over a waste-trough $j$ at the other end. The overflow-trough $i$ serves to prevent the water in the pan $f$ from rising to the height where it would flow over the walls of said pan onto the parts below. The receptacle $d$ is closed at the top by a cover $k$, having openings in its sides to which pipes $l$ are fitted and from which they extend to the rooms to be heated or cooled. The cover $k$ confines the air in the receptacle $d$ and causes it to pass over or come into contact with the water in the pan $f$ or the vapor arising therefrom before escaping into the pipes $l$.

When my system and apparatus are to be employed for heating purposes, heat may be supplied to the radiators or coils $b$ and $e$ in any convenient and suitable manner, an ordinary steam-heating boiler of the low-pressure type being preferred and indicated at E in Fig. 1. A live-steam pipe $m$ connects the boiler E with the nearest radiator or set of coils $b$, and the steam after circulating through all of the coils $b$ and the coil $e$ returns to said boiler through a pipe $m'$. Through the medium of the parts previously described the air which enters the conduit D circulates fully and freely about the radiators $b$, then rises to receive more heat from the coil $e$ and to commingle with the moisture above said coil, and finally passes at a proper temperature and sufficiently moistened through the pipes $l$ to the several rooms. The construction and arrangement of the parts insure adequate and complete circulation throughout the apparatus and rooms, as well as proper heating and moistening of the air. During warm weather I disconnect the boiler or other heat-producer from the coils and connect the latter with the water system of the building in order to utilize my invention for cooling purposes. As an illustration of means for carrying out this plan a pipe $p$ is shown in Fig. 1, which communicates with the water-main and the pipe $m$, and a pipe $p'$, which supplies the building with water and is connected to the pipe $m'$, the pipes $p$ and $p'$ being provided with valves $o$ and $o'$, respectively. The change above referred to is effected by closing a valve $n$ in the pipe $m$ and a valve $n'$ in the pipe $m'$ and opening the valves $o$ and $o'$. As practically no flow of air through the apparatus will take place naturally in the absence of heat from the coils, a fan $q$ (indicated by dotted lines in Fig. 1) is placed in position in the conduit D near its junction with the case A and any well-known means employed to run the same. A door D' is arranged at the side of the conduit D to facilitate the insertion and removal of the fan. Of course the fan may be located in some other place, if desired. The fan $q$ forces the air which the conduit D receives from the outside into and through the case A and the receptacle $d$, around and through the coils $b$ and $e$, which are now cooled by the water therein, over and about the water-pan $f$, and finally through the pipes $l$ to the rooms, the circulation being thorough and complete, as before, with the air properly cooled and moistened to meet the requirements incident to hot weather.

It will readily be seen that by connecting the coils with the water system at a point between the supply and delivery the cooling effect of the water may all be utilized without expense, because the amount of water usually drawn is sufficient to change the contents of the coils frequently enough to answer the purpose. If, however, a greater cooling effect is required, it is only necessary to open a faucet and allow a small quantity of water to escape constantly.

In order to meet the requirements of different altitudes or variations in degree of dryness or humidity, it is necessary to provide means to regulate the supply of water to the pan $f$, and such means is found in the faucet $h$, which controls the flow of water from a suitable source of supply. By supplying as much water only drop by drop to the heated pan $f$ as will all evaporate I am able to meet the requirements of high altitudes or dry atmospheric conditions, while at low altitudes or under humid conditions the drop-by-drop feed is sufficiently increased to keep more water constantly in said pan than will entirely evaporate, or, in other words, to supply enough water to lower the temperature of the pan, and consequently decrease the evaporation. These different conditions of outside atmosphere can be readily and successfully met, so as to insure a substantially uniform impregnation with moisture of the air on its way to the rooms, by turning the faucet $h$ to increase or decrease the amount of drip into the trough $g$ and thence into the pan $f$.

While the plates C and $c$ are shown and described as being placed in a vertical position, it will be understood that they may be arranged horizontally without departing from the nature of my invention, although by preference the plates C should stand as shown when upright coils $b$ are used. Furthermore, there would be no violation of the spirit of my invention in placing the coils $b$ in a reclining position. These and other minor changes within the limit of mechanical equivalents may be made, if deemed expedient, and an arrangement of the aforesaid plates whereby they are placed horizontally is considered to be such an equivalent of the plates C and $c$.

What I claim as my invention, and desire to secure by Letters Patent, is—

1. The combination, with a case A, of a series of coils arranged therein in a step-by-step manner, an upper series of plates, a lower series of plates, both series being arranged in said case between said coils, and the plates of one series alternating with those of the other, whereby to cause air to traverse a tortuous course through the case, means to force air into the case at one end, pipes arranged to conduct air from the opposite end of the case to the rooms of a building, a horizontal coil with a superimposed water-pan located between the upper end of the case and the outlet-pipes, substantially as set forth.

2. The combination, with an inlet air-conduit provided at its outer terminal with a series of plates substantially as shown to retard the inflow of air, of a case into the lower end of which said conduit opens, a series of coils arranged in said case in a step-by-step manner, an upper series of plates, a lower series of plates, both series being arranged between said coils in the case and the plates of one series alternating with those of the other, an outlet-receptacle at the upper end of the case having a coil therein, a water reservoir or pan in said receptacle, a cover on the receptacle, and pipes opening into the receptacle and adapted to be extended to the various rooms of the building, in the manner set forth.

3. The combination of a case, a plurality of connected radiators arranged therein, upper and lower series of plates located in the case, the upper plates alternating with the lower plates, a pan located at the discharge end of the case, means for supplying water thereto, and feed and discharge pipes leading to and from the said radiators, one of said pipes being passed under the pan to affect the temperature thereof.

4. The combination of a case, a plurality of connected radiators arranged therein, upper and lower series of plates located in the case, the upper plates alternating with the lower plates, a pan located at the discharge end of the case, means for supplying water thereto, feed and discharge pipes leading to and from the said radiators, one of said pipes being passed under the pan to affect the temperature thereof, a conduit leading to the inlet end of the case, and baffle-plates located in the conduit, for the purpose specified.

CHARS. CLUTHE.

Witnesses:
ALLEN WEBSTER,
LEWIS C. MUZZY.